United States Patent [19]

Itō

[11] Patent Number: 4,803,806
[45] Date of Patent: Feb. 14, 1989

[54] MATERIAL FOR MULTI-LEVEL FLOWER BEDS

[76] Inventor: Takami Itō, 20, B-40, 1-chome, Minamikasugaoka, Ibaragi-shi, Osaka, fu, Japan

[21] Appl. No.: 99,254

[22] Filed: Sep. 21, 1987

[30] Foreign Application Priority Data

Sep. 30, 1986 [JP] Japan .................. 61-151395[U]

[51] Int. Cl.$^4$ .......................... A47G 7/00; A01G 9/02
[52] U.S. Cl. ............................... 47/39; 47/86; 47/67; 47/83; 47/87; 248/27.8; 428/23; 428/27; 428/11
[58] Field of Search .............. 428/7, 17, 23, 27, 11, 428/131, 33, 24, 22; 248/27.8; 47/33, 62, 66, 79, 82, 85, 86, 87, 80, 39, 67, 83

[56] References Cited

U.S. PATENT DOCUMENTS

| | | | |
|---|---|---|---|
| 3,028,705 | 4/1962 | Howard | 47/87 |
| 3,035,369 | 5/1962 | Helfert | 47/87 |
| 3,539,071 | 10/1970 | Ludder | 47/86 |
| 3,825,126 | 7/1974 | Pohl et al. | 47/86 |
| 3,866,351 | 2/1975 | Cobia | 47/81 |
| 4,040,207 | 8/1977 | Lancaster | 47/80 |
| 4,213,271 | 7/1980 | Petruzzi et al. | 47/79 |

Primary Examiner—Ellis P. Robinson
Assistant Examiner—Donald J. Loney
Attorney, Agent, or Firm—Larson and Taylor

[57] ABSTRACT

An ornamental flower bed base assembly or matrix material comprising a flower bed base plate having a plurality of insertion through-holes disposed at appropriate intervals and a plurality of flower plant holders each having a side wall provided with irrigation orifices and an open top end, each of the flower plant holders being removably engageable with the respective insertion through-holes of the base plate. This matrix is lightweight and can be easily transported to the contemplated site of erection. Using this ornamental flower bed matrix material, a variety of ornamental flower beds can be constructed easily at site. The resulting flower beds are attractive and easy in maintenance.

12 Claims, 7 Drawing Sheets

MATERIAL FOR MULTI-LEVEL FLOWER BEDS

BACKGROUND OF THE INVENTION

1. Field of the Invention

This invention relates to a structural base assembly or matrix material for construction of ornamental flower beds. The term 'ornamental flower bed' as used in this specification and the claims appended thereto does not mean a flower bed which is three-dimensioinal and ornamental on account of the natural height, shape and color of flower plants but a flower bed which is made three-dimensionally ornamental by artificial means.

2. Brief Description of the Prior Art

The hiterto-known ornamental flower beds of this type include one comprising a slant or otherwise shaped earth surface on which flower plants have been planted, a cluster of flower plants grown and trimmed to a predetermined three-dimensional configuration or a fence or hedge populated by vines or the like to give an ornate appearance.

However, the flower bed formed by utilizing the natural ground or landscaping is at best a sloped flower bed on account of the restrictions of cultivation (sowing, germination and growth) and lacks portability so that it can be formed only in a fixed place or position.

The flower bed to be formed by trimming flowers to a given shape is not only disadvantageous in that the flower plants are thereby injured but suffers loses in attractiveness. The flower bed using vines is subject to serious limitations in the kinds of flowers that can be planted and in the three-dimensional shape so that it is poor in landscaping or ornamental effect. Moreover, these flower ends are either not portable or difficult to transport. Recently, there has been developed the so-called "hanging basket flower" which is such that a plurality of flower plants are planted in a wire-mesh basket-type pot which is to be hung indoors or outdoors for viewing.

In this case, fertile soil is put in the hanging basket and the roots of a plurality of flower plants are inserted into the soil through meshes formed at fairly large intervals on one side of the basket in such a manner that the flowers will be exposed on the lateral side. However, it is time- and labor-consuming to plant a large number of flower plants and, in addition, the use of large amounts of soil, moss and so on results in a very large total weight which, by itself, makes the basket difficult to retain its shape. Moreover, the irrigation water is readily evaporated in the top layer of the soil while the bottom layer is always over-moisturized and the earth pressure tends to adversely affect the growth of the plant roots in the bottom layer. Furthermore, it is very difficult to replace only the injured or withered plants.

SUMMARY OF THE INVENTION

This invention relates to a base assembly or structural material for the construction of an ornamental flower bed.

It is a primary object of this invention to provide an ornamental flower bed base assembly or matrix material with which a broad variety of ornamental flower beds, such as a spherical ornamental flower bed generally known as "flower ball", a flower wall, and a panel-type ornamental flower be called "wall garden", can bed easily and positively constructed in any place on any occasion.

It is another object of this invention to provide an ornamental flower bed base assembly or matrix material such that the mounting and dismounting of flower holders with respect to a base plate are facilitated so that either an across-the-board replacement or a partial replacement of the flower plants can be carried out at any time to maintain the attractiveness of the flower bed.

It is a further object of the invention is to provide an ornamental flower bed base assembly or matrix material which is portable to any desired location and, because of reduced soil requirements, does not have an adverse effect on the flower plants due to earth pressure, besides being conducive to easy and uniform irrigation.

The ornamental flower bed base assembly or matrix material according to this invention comprises a flower bed base plate having a plurality of insertion mounting openings or through-holes disposed at appropriate intervals and a plurality of flower plant holders each having a peripheral wall provided with irrigation orifices and an open top end, said flower plant holders being removably mounted in the respective insertion through-holes.

In the above ornamental flower bed base assembly or matrix material of this invention, flower plant holders can be removably mounted in the through-holes of the base plate so that when the base frame is spherical in configuration, a spherical ornamental flower bed (flower ball) and when the base plate is planar in configuration, a wall-type ornamental flower bed (flower wall, wall garden) can be easily set up in any desired place.

Furthermore, when some of the flower plants were damaged, they can be readily replaced with healthy flower plants by dismounting the corresponding flower plant holders.

Moreover, since each flower plant holder is provided with irrigation openings or orifices, irrigation water can be supplied from all sides inclusive of the open top end and this feature, taken together with the ventilation effect they offer, helps prevent withering and root rot of the flower plants.

In addition, since the soil, etc. are individually carried by each flower plant holder, the overall weight as an ornamental flower bed can be decreased. Therefore, particularly due to the characteristic advantage that each flower plant holder can be dismounted from the base plate, the flower bed can be transported to any desired place where it may be easily erected. Moreover, the required amount of soil and the like may be small as compared with the conventional basket type flower bed and there is no adverse influence of earth pressure on the flower plants. In addition, by using curved and planar base plates in various combinations, not only the aforesaid wall-type flower bed (flower wall) and spherical flower bed (flower ball) but also a variety of ornamental flower beds such as a semi-spherical flower bed, a cylindrical flower bed, etc. can be easily assembled.

BRIEF DESCRIPTION OF THE DRAWINGS

In the accompanying drawings which illustrate working examples of this invention.

DETAILED DESCRIPTION OF THE EMBODIMENTS

In the embodiment illustrated in FIG. 1 through FIG. 6, the ornamental flower bed base assembly or matrix material 1 according to this invention comprises a base plate 2 and a plurality of flower plant holders 3 which can be removably mounted on said base plate 2. The base plate 2 is part of a hollow base frame 4 forming a semi-spherical curved surface and a plurality of circular mounting openings or insertion through-holes 5 disposed at uniform intervals over the entire surface of said hollow base frame 4. This base plate 2 is made of plastics or light metal so that it will not contribute much to the overall weight.

Figure 4:
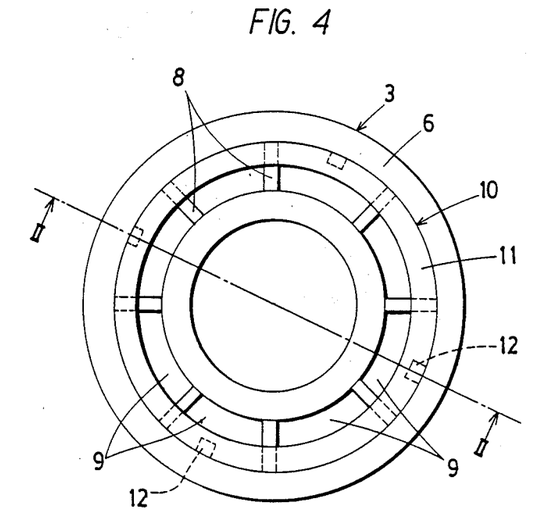
FIG. 4 is a front view showing an example of flower plant holder.
Figure 5:
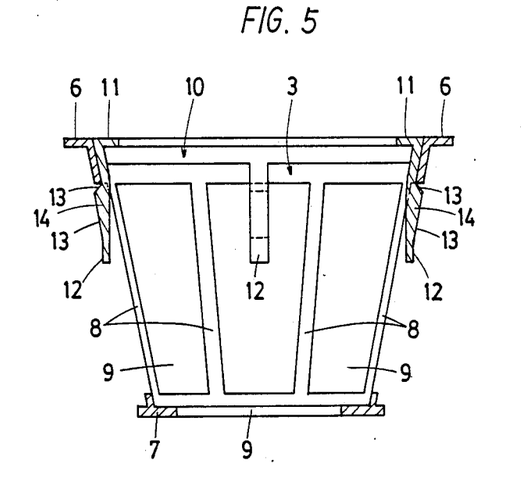
FIG. 5 is a cross-section view taken along the line II—II of FIG. 4.

The flower plant holders 3 are also made of lightweight plastics and, in this particular embodiment, each consists of a top ring-shaped flange frame 6, a ring-shaped bottom frame 7 and a plurality of longitudinal frame members 8 interconnecting said top and bottom frames and forming a lateral side of the flower plant holder 3. Therefore, this flower plant holder is open not only at the top but has ample irrigation openings or orifices 9 along the lateral and bottom sides. Moreover, this flower plant holder 3 has a flower plant anti-slip member 10 adapted to prevent accidental slip-off of the flower plants. The anti-slip member 10, in this embodiment, comprises a top ring-shaped, inwardly-oriented flange 11, a plurality of legs 12 projecting downwards from said flange 11 with some outwardly biasing resilient force, and an engaging projection 14 having upper and lower tapered guide faces 13. When this flower plant antislip member 10 is inserted into the holder 3, said projection 14 is engageable with the lower edge of the flange frame 6 of the holder 3.

Figure 1:
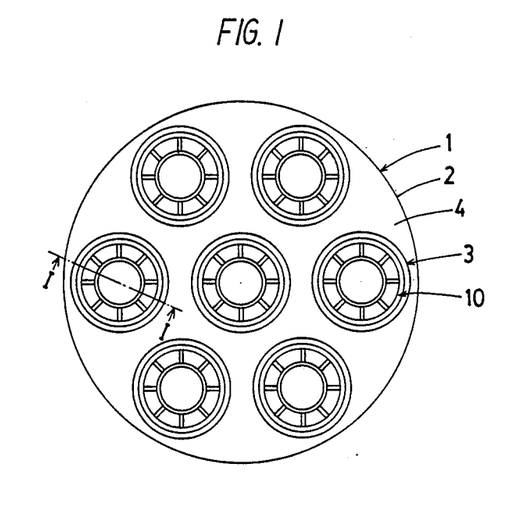
FIG. 1 is a schematic front view showing an ornamental flower bed base assembly or matrix material conformed in a semi-spherical configuration.
Figure 2:
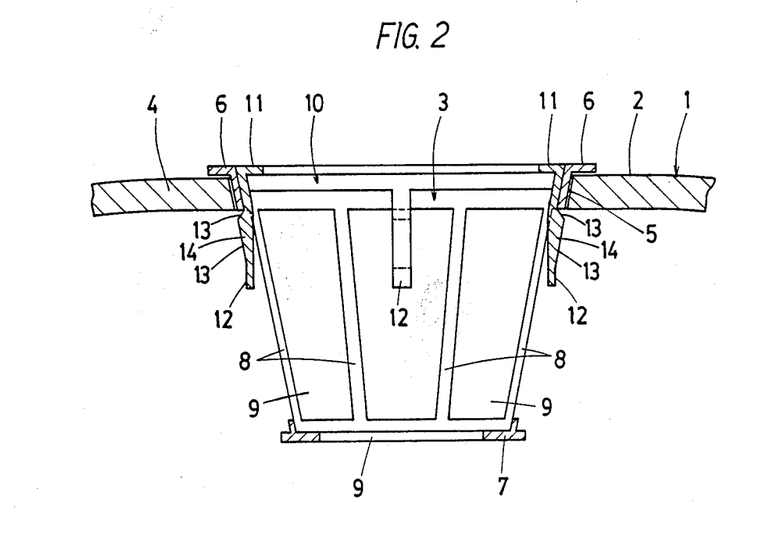
FIG. 2 is an enlarged cross-section view taken along the line I—I of FIG. 1.
Figure 3:
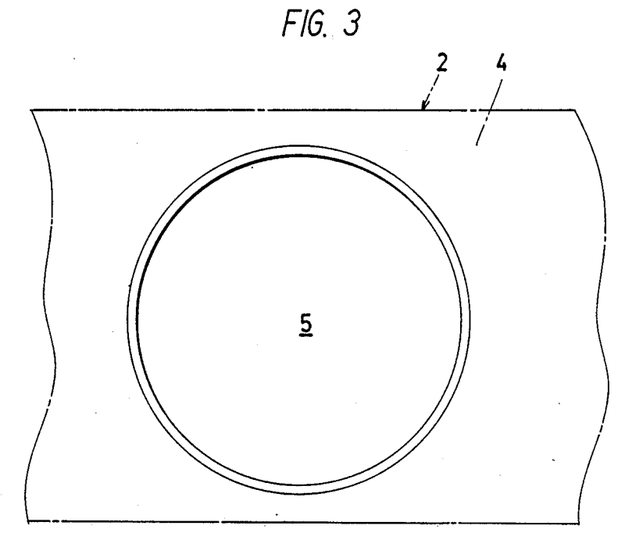
FIG. 3 is a front view showing an insertion hole or mounting opening formed in the base plate.

The overall configuration of the holder 3 is preferably a tapered shape like the usual flower pot, for the mounting thereof into the insertion throughhole 5 can then be carried out smoothly. Moreover, the outer diameter of the top portion of the holder 3 is preferably made slightly larger than the inner diameter of the insertion through-hole 5, for the holder is then fit tight into the hole 5 so that it will not easily move off. To set the holder 3 securely in the insertion through-hole 5, one may insert the holder 3 into the hole 5 and cause the projection 14 of the flower plant anti-slip member 10 to engage the lower circumferential edge of the insertion hole 5. The holder 3 can be easily dislodged from the insertion through-hole 5 by pulling the holder 3 in the outward direction. As an alternative mounting method, though not shown, it may be so arranged that an engaging projection having upper and lower guide faces is provided externally of the longitudinal frame 8 of the holder so that when the holder is removably inserted into the insertion throughhole, said projection engages the inner portion of the peripheral edge of the throughhole. Many other mounting modes may be used without departing from the scope of this invention.

Figure 6:
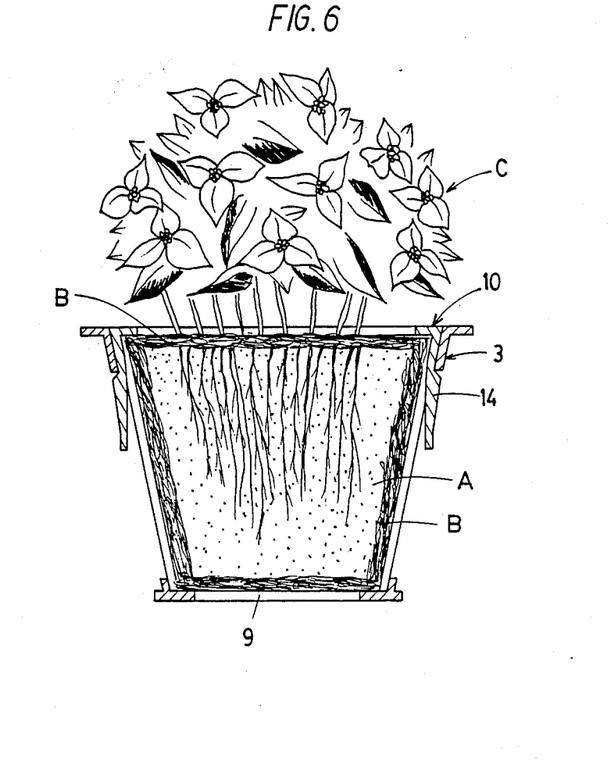
FIG. 6 is a cross-section view showing flower plants as planted in the same flower plant holder.

The following is a description of an exemplary procedure for planting flower plants in the flower plant holder 3 constructed as above. In order to prevent spilling of soil A from the holder, a material B having both water-penetrability and water-holding properties such as sphagnum (moss), polyurethane from sponge, rock wool or the like is first set in position and, then, soil A is poured into the holder. Flower plants C are then planted in the soil and an additional amount of said material B is laid over the roots of the plants. By so doing, the soil A is precluded from being scattered away or the irrigation water from oozing out from the irrigation orifices. When grown in this condition for a certain time, the flower plants C grow and develop in the holder 3 and the flower plants are positively protected by the anti-slip members of the holder against slip-off so that even if the holder is inclined on its side or inverted, the flower plants will not slip off from the holder.

Figure 7:
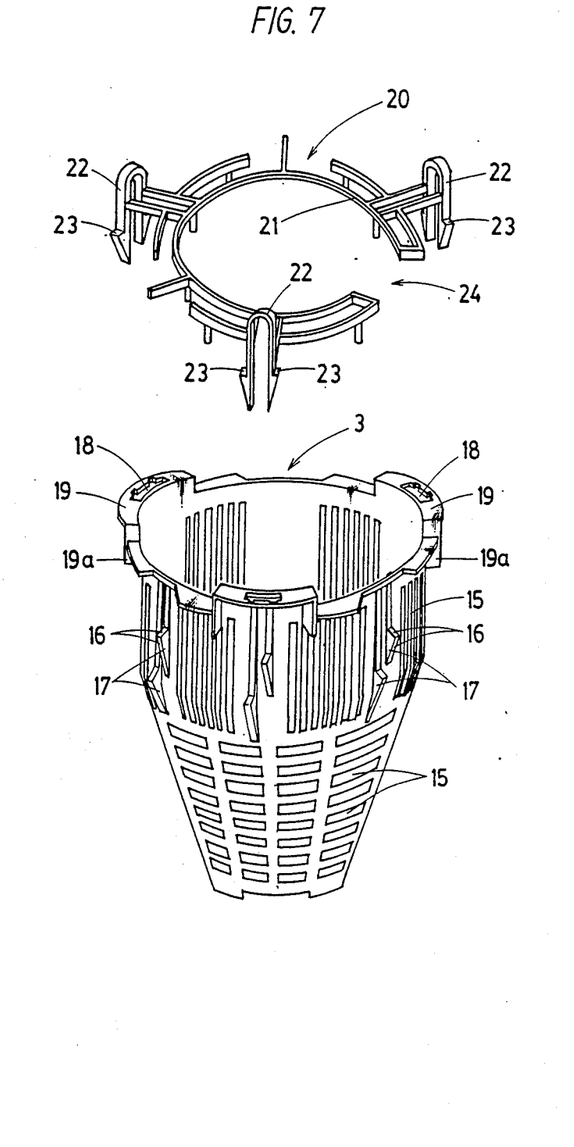
FIG. 7 is a disassembled perspective view showing another example of flower plant holder.
Figure 8:
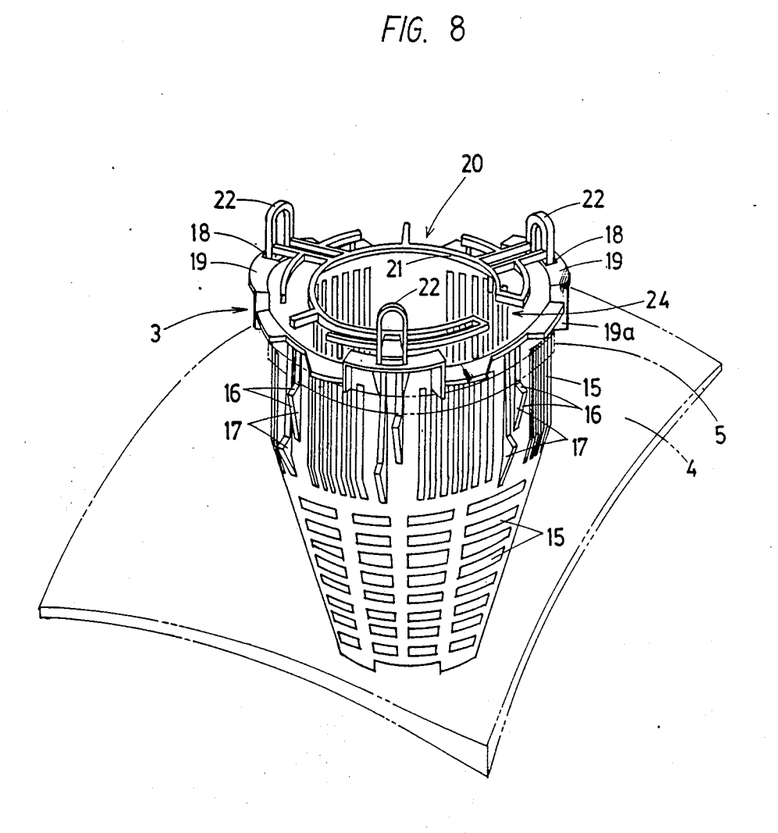
FIG. 8 is a perspective view showing an assembled flower plant holder as mounted in the base plate.

FIGS. 7 and 8 show another embodiment of the flower plant holder according to this invention.

This flower plant holder 3, too, is made of lightweight plastics and is provided with a plurality of slit-like irrigation openings or orifices 15, Moreover, in a plurality of positions on the upper part of the peripheral wall of the holder 3, a couple of engaging projections 17, 17 having upper and lower tapered mounting guide faces 16, respectively, are provided in two vertical rows at suitable intervals. In addition, at appropriate intervals on the top peripheral part of the flower plant holder 3, a plurality of flanges 19 each having an engaging hole 18 are provided.

Moreover, this flower plant holder 3 is provided with an anti-slip means 20 adapted to prevent accidental slip-off of the flower plants from the holder 3. This anti-slip member 20 is also molded from lightweight plastics and consists of a ring-shaped anti-slip body, the diameter of which is smaller than the inner diameter of the top opening of holder 3 and a plurality of engaging members 22 adapted to be inserted into the respective engaging holes 18 of the holder 3, each of said engaging members extending downwardly from the outer periphery of said body 21. As shown in FIG. 7, this engaging member 22 has an engaging land 23 disposed on the outer side of each of its two legs and as these two legs of each engaging member 22 are forced into the corresponding engaging hole 18, the engaging lands 23 are engaged by the lower edge of the flange 19 so as to mount the anti-slip member 20 on the top of the flower plant holder 3. Moreover, by closing the two legs of each engaging member 20 by inward biasing, the anti-slip member 20 can be separated from the flower plant holder 3. Moreover, the ring-shaped body 21 of this anti-slip member 20 is discontinuous in one position so that even if there is a minor error in the relative position of each engaging hole 18 and engaging member 22, this discontinuation 24 assures smooth engagement and disengagement between the two elements.

As shown in FIG. 8, the flower plant holder 3 having the above construction can be positively mounted in the insertion through-hole 5 by inserting the holder 3 into the hole 5 and, then, engaging the peripheral edge of the insertion through-hole 5 between the engaging projections 17 in the upper row, among the projections 17, 17 provided in two vertical rows, and a reinforcing rib 19a of each flange 19. The holder 3 may be easily dismounted from the insertion throughhole 5 by pulling it outwardly.

The engaging projections 17 in the lower row are provided as a secondary means for preventing disengagement of the holder 3 from the insertion through-hole 5 when the engaging projections 17 in the upper row are accidentally disengaged from the insertion through-hole 5.

Then, a variety of modes can be employed for assembling such flower plant holders 3 carrying flower plants with the base plate 2 to construct an ornamental flower bed. To construct a spherical ornamental flower bed F as illustrated in FIG. 9, for instance, two base plates 2 each part of a hollow spherically curved base frame 4 may be jointed by mating their open ends with each other and mounting a plurality of holders 3 carrying flower plants C into the respective insertion through-holes 5 of the base plate 2.

Figure 9:
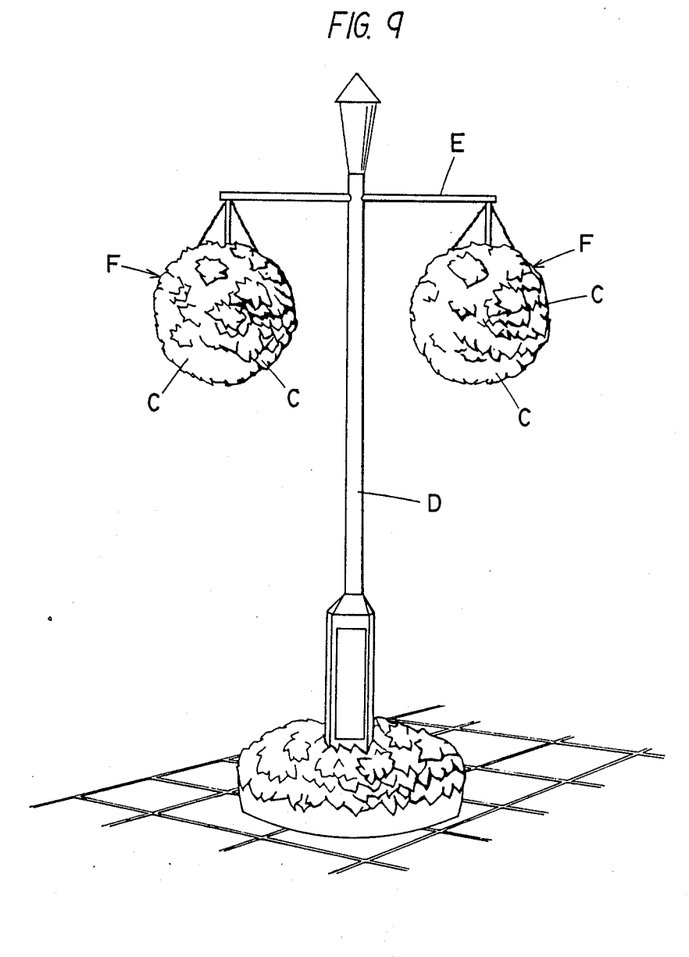
FIG. 9 is a perspective view showing an example of use of spherical ornamental flower beds.

And the spherical ornamental flower bed F can for example be used as suspended from both ends of the horizontal beam E of a pole D as illustrated in FIG. 9. In this arrangement, the attractiveness of the flower balls as an ornamental flower bed is further enhanced.

Figure 10:
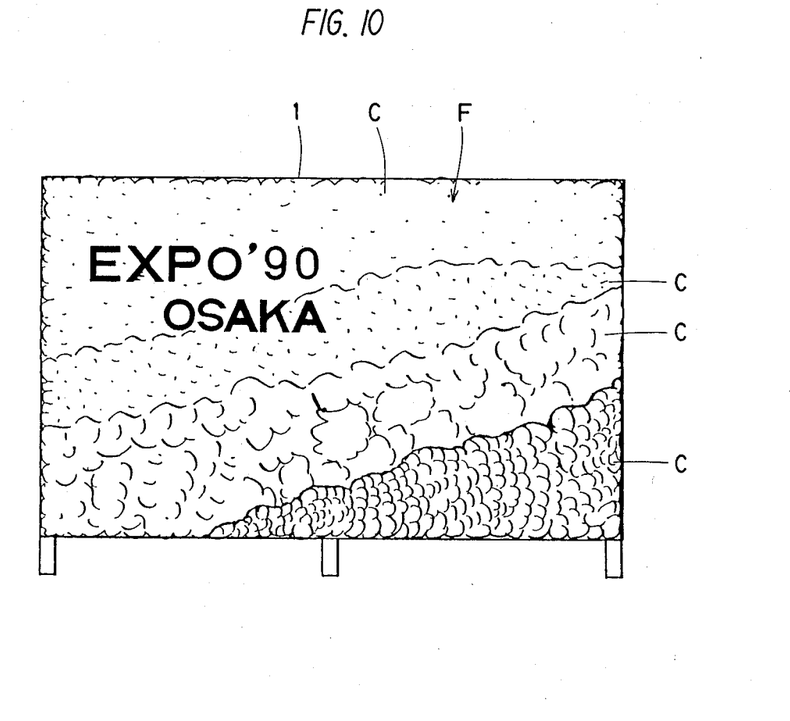
FIG. 10 is a front view showing an example of wall type ornamental flower bed.

When it is desired to construct a wall type ornamental flower bed F such as the one shown in FIG. 10, a rectangular hollow base plate having a flat surface (not shown) may be provided with a multiplicity of circular or rectangular insertion through-holes at equal intervals over its entire surface and a flower plant holder 3 carrying flower plants be inserted into each of the through-holes. The resulting product is a flower wall type ornamental flower bed F.

The above description pertains only to some preferred embodiments of this invention and these embodiments are only illustrative of the invention and by no means limitative of the scope of the invention. Thus, many changes and modifications may be made in the shape, construction, relative position, etc. of said base plate 2, insersion through-holes 5, flower plant holders 3, irrigation orifices 9, 15, anti-slip members 10, 20, engaging projections 14, 17 and so on without departing from the scope of this invention.

What is claimed is:

1. A base assembly for constructing a three-dimensional flower bed comprising:
a base frame including a base plate, said base plate being formed in a desired shape and having a plurality of through mounting openings formed at desired positions; and
a plurality of plant holders which are individually received in a respective one of said mounting openings, each said plant holder including a side wall provided with irrigation openings, an open top, an outwardly projecting flange around the periphery of said top which prevents said plant holder from passing through a respective said mounting opening, and a plurality of projections located at spaced locations around said said wall and spaced from said flange such that each said plant holder is removably and positively engaged in a respective said mounting opening by said projections on one side of said base plate and said flange on the other side of said base plate.

2. A base assembly for constructing a three-dimensional flower bed according to claim 1. wherein said base frame is a hollow element.

3. A base asssmbly for constructing a three-dimensional flower bed according to claim 1. wherein said base plate is a curved element.

4. A base assembly for constructing a three-dimensional flower bed according to claim 1. wherein said base plate is a planar element.

5. A base assembly for constructing a three-dimensional flower bed according to claim 1. wherein said base plate is a spherical element.

6. A base assembly for constructing a three-dimensional flower bed according to claim 1. wherein said flower base plate is a semi-spherical element.

7. A base assembly for constructing a three-dimensional flower bed according to claim 1. wherein said base plate is a wall-shaped element.

8. A base assembly for constructing a three-dimensional flower bed according to claim 1. wherein said base plate comprises a curved element and a planar element in combination.

9. A base assembly for constructing three-dimensional flower beds according to claim 1., wherein each said flower plant holder further includes a member extending radially inwardly from the periphery of said top which prevents slipping out of a flower plant located in said plant holder through said open top of said plant holder.

10. A base assembly for constructing three-dimensional flower beds according to claim 9 wherein each said flower plant holder further includes a lock means for removably locking said member to the periphery of said top.

11. A base assembly for constructing three-dimensional flower beds according to claim 1., wherein each said projection has a downwardly and inwardly tapered guide face.

12. A base assembly for constructing three-dimensional flower beds according to claim 10, wherein each said projection also has an upwardly and inwardly tapered guide face extending upwardly from said downwardly and inwardly tapered guide face.

* * * * *